A. G. ELVIN & F. W. MARTIN.
FLEXIBLE PIPE COUPLING.
APPLICATION FILED FEB. 28, 1913.
1,119,501. Patented Dec. 1, 1914.
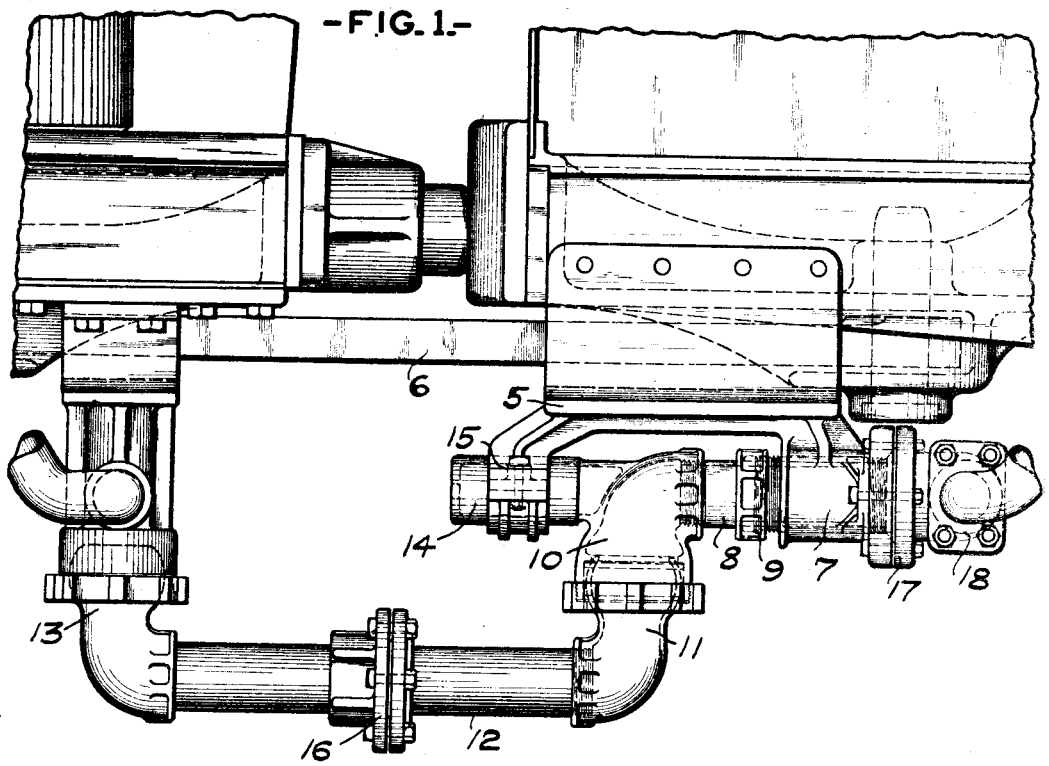
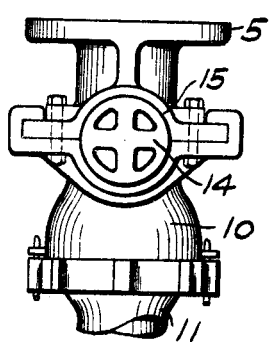
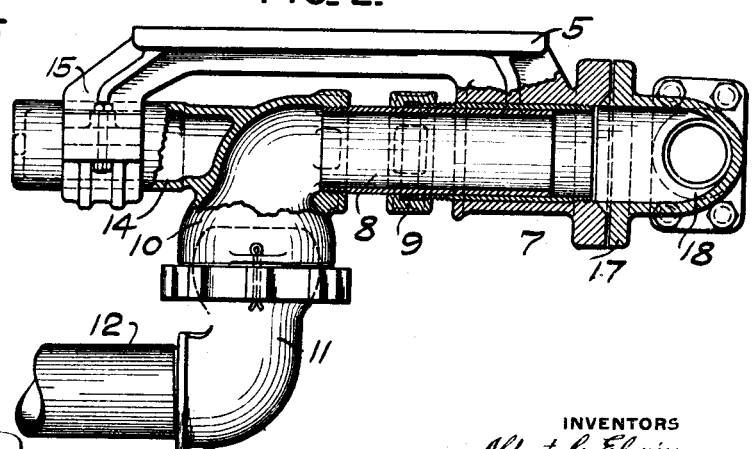
WITNESSES
INVENTORS
Albert G. Elvin
Frederick W. Martin
by Edward A. Wright Atty

UNITED STATES PATENT OFFICE.

ALBERT G. ELVIN, OF SOMERVILLE, NEW JERSEY, AND FREDERICK W. MARTIN, OF NEW YORK, N. Y., ASSIGNORS, BY DIRECT AND MESNE ASSIGNMENTS, TO FRANKLIN RAILWAY SUPPLY COMPANY, OF WILMINGTON, DELAWARE, A CORPORATION OF DELAWARE.

FLEXIBLE PIPE-COUPLING.

1,119,501.  Specification of Letters Patent.  Patented Dec. 1, 1914.

Application filed February 28, 1913. Serial No. 751,193.

*To all whom it may concern:*

Be it known that we, ALBERT G. ELVIN and FREDERICK W. MARTIN, both citizens of the United States, and residents, respectively, of Somerville, in the county of Somerset and State of New Jersey, and the borough of Manhattan, in the city, county, and State of New York, have invented a certain new and useful Improvement in Flexible Pipe-Couplings, of which improvement the following is a specification.

This invention relates to flexible pipe couplings, and more particularly to such pipe joints or couplings for connecting the pipe sections on the engine and tender of a locomotive or other vehicles of a train. Pipe connections of this character for conducting water, steam, or other fluid from one vehicle to another must have sufficient flexibility to provide for the relative movement between said vehicles in the running of the train, and the principal object of our invention is to provide an improved coupling of this type which shall be of simple and compact construction and having a longitudinally slidable member mounted on one of the vehicles for allowing for the slack movement between the same.

In the accompanying drawings: Figure 1 is a side elevation of a pipe coupling embodying our improvement, and applied to the water conducting pipe from a tender to an engine of a locomotive; Fig. 2, a side view, partly in longitudinal section, of the improved coupling device adapted to be mounted on the engine; and Fig. 3, an end view of the same.

According to our improvement, one of the vehicles, preferably the engine, is provided with a bracket, 5, preferably secured just beneath and substantially in the same vertical plane with the draw bar, 6, and having a tubular member, 7, in which a telescoping pipe section, 8, is mounted to slide. A packing nut or gland, 9, is mounted on the tubular member, 7, and around the pipe, 8, to prevent leakage at the sliding joint. The pipe, 8, is connected to the body, 10, of a universal coupling, preferably a ball and socket joint, the other member, 11, of which is connected to the pipe, 12, extending to a similar coupling, 13, on the other vehicle. In order to assist in the guiding and supporting of the body, 10, of the ball joint, an extension guide, 14, may be provided, projecting longitudinally, and slidably mounted in an arm, 15, of the bracket, 5. For the purpose of readily uncoupling the engine and tender, the pipe, 12, is provided with a flange union, 16.

The tubular portion, 7, may be connected by means of a suitable union, 17, with a fitting, 18, having one or more branches for connecting with corresponding pipes carried on the engine, and in a similar manner, the body portion of the coupling, 13, on the tender may be connected to one or more pipe lines. Where the coupling is used for conducting water, the branches on the tender may lead from the tank valves, and the branches on the engine be connected to two or more injectors.

It will now be seen that the universal or ball joints, 10 and 13, provide for all of relative lateral swinging and vertical movements between the respective vehicles, while the longitudinally sliding joint allows for all of the relative slack movement. As the bracket connection is preferably located beneath or in line with the draw bar, the relative movement to be accommodated is thus reduced to a minimum.

Having now described our invention, what we claim as new and desire to secure by Letters Patent is:

1. In a pipe coupling for railway vehicles, the combination of a tubular member supported on one vehicle, a telescoping section mounted to have a relative longitudinal sliding movement therewith, a longitudinal guide for said telescoping member, and a pipe section having a flexible joint communicating with said telescoping member.

2. In a pipe coupling for railway vehicles, the combination of a draw bar, a tubular member supported on one of the vehicles substantially beneath and in vertical plane with said draw bar, a telescoping pipe section mounted to have a longitudinally sliding movement relative thereto, a universal joint communicating with said telescoping section, and a pipe section adapted to connect the same with the other vehicle.

3. In a pipe coupling for railway vehicles, the combination of a tubular member supported on one vehicle, a telescoping pipe section mounted to have a longitudinally sliding movement relative thereto, a universal joint communicating with said telescoping section, another universal joint member connected to the pipe line of the other vehicle, and a pipe section having a detachable union connecting said universal joint members.

4. In a pipe coupling for railway vehicles, the combination of a bracket having a tubular member adapted to be supported on one vehicle, a telescoping section mounted to have a relative longitudinal sliding movement therewith, a projecting guide extending in line with said telescoping member, a bearing for said guide, and a pipe section having a flexible joint communicating with said telescoping member.

5. In a pipe coupling for railway vehicles, the combination with a bracket adapted to be supported on a vehicle and having a tubular section and a guide bearing, of a universal coupling having a body portion provided with a telescoping section extending within the tubular section and mounted to slide longitudinally, and a guide projecting in the opposite direction through said guide bearing of the bracket.

ALBERT G. ELVIN.
FREDERICK W. MARTIN.

Witnesses:
　JOHN L. MOHUN,
　WM. T. LANE.